Dec. 22, 1964

M. L. HALL 3,162,505

DEVICE FOR LOCATING PIPELINE LEAKS

Filed Aug. 21, 1961

INVENTOR.
MARVIN L. HALL

BY

ATTORNEY

3,162,505
DEVICE FOR LOCATING PIPELINE LEAKS
Marvin L. Hall, Houston, Tex., assignor to Continental Oil Company, Ponca City, Okla., a corporation of Delaware
Filed Aug. 21, 1961, Ser. No. 132,785
2 Claims. (Cl. 346—33)

The present invention relates to means for logging pipeline data and more particularly, but not by way of limitation, relates to a device for detecting and locating leaks in buried or otherwise inaccessible pipeline.

As is known in the art, various methods and devices have been used to detect leaks in buried pipelines. One method employs a radioactive fluid which is passed through the pipeline and escapes through any leak into the surrounding soil. The radioactive fluid is then flushed from the interior of the pipeline, but the radioactive fluid which passed through the leak remains in the soil surrounding the pipe for a period of time. A radioactive detector, such as a Geiger counter, is then passed through the pipeline and the presence of the lingering radioactivity is detected and recorded. By using this method, a leak can be detected with reasonable certainty. The difficulty with the detecting method lies in precisely locating the leak or other undesirable condition which is detected so that it can be repaired.

In accordance with the present invention, a fluidtight housing is propelled through a pipeline by the force of the fluid flowing in the pipeline. A recorder is located within the housing and is capable of recording a plurality of separate data tracks on a single tape. The recorder is driven by drive means which engages the interior walls of the pipe. Therefore, the length of the record tape is proportional to the distance the device travels in the pipeline being surveyed. Means are also provided within the housing to mark the separate data tracks of the tape with distance intervals, elapsed time intervals, and reference marks by radioactive or magnetic reference means located at known points outside the pipeline. Means are provided within the housing for detecting the presence of leaks in the pipeline and for furnishing suitable impulses for recordation on the tape. As a result of the information recorded on the four separate data tracks on a single record tape, the exact location of the leak can be determined with great accuracy.

Therefore, it is an important object of the present invention to provide an improved device for locating leaks in buried or otherwise inaccessible pipelines.

Another object of the present invention is to provide a device of the type described in which the length of the record tape is proportional to the length of the pipeline traversed.

Another object of the present invention is to provide a drive means for driving a tape recorder disposed within a fluidtight housing, which drive means does not pass through the housing and therefore does not require pressure seals to prevent leakage.

Additional objects and advantages will be evident from the following detailed description and drawings, wherein.

Figure 1:
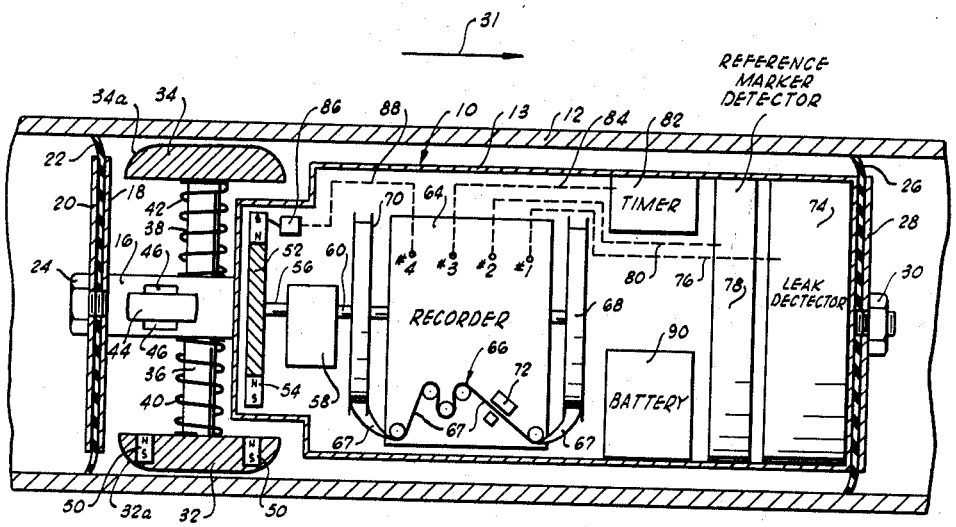
FIGURE 1 is a plan schematic view of a logging device constructed in accordance with the present invention.

Referring now to the drawings, a logging device indicated generally by the reference numeral 10 is shown disposed in a pipeline 12. The device 10 has a fluidtight housing 13, preferably fabricated from a nonmagnetic material. A support stem 16 is rigidly connected to and extends rearwardly from the housing 13. A pair of circular, stiff discs 18 and 20 clamp a resilient disc 22 therebetween by means of a nut 24 or other suitable fastening means connected to the stem 16. The resilient disc 22 is preferably of slightly greater diameter than the diameter of the pipe 12 to form an annular seal between the disc 22 and the interior wall of the pipeline 12. A similar circular resilient disc 26 is clamped to the front end of the housing 10 by a metallic disc 28 and a nut 30. The resilient disc 26 also preferably has a slightly greater diameter than the internal diameter of the pipeline 12. The two resilient discs 22 and 26 form a fluid seal between the logging device 10 and the pipeline 12 and the force of the fluid flowing in the pipeline in the direction of arrow 31 propels the device 10 through the pipeline. The propelling force is caused by pressure which acts upon the total area comprised of the exposed annular area of the resilient disc 22, the area of the metallic disc 20 and the area of the nut 24 to propel the logging device 10 through the pipeline with considerable force. Any fluid which bypasses the resilient seal formed by the disc 22 will also exert a force against the annular exposed area of the disc 26.

A pair of drive wheels 32 and 34 are journaled on axles 36 and 38, respectively, which are connected to the support stem 16. The drive wheels 32 and 34 preferably have curved rims 32a and 34a to insure maximum contact area with the walls of the pipeline 12. The axles 36 and 38 are preferably expansible so that coil springs 40 and 42 disposed around the axles can continually urge the drive wheels 32 and 34 outwardly into positive engagement with the interior walls of the pipeline 12. A third idler wheel 44 is journaled in a vertically upstanding yoke 46 which is connected to the support stem 16. The yoke 46 is also expansible and the wheel 44 is urged upwardly by a spring (not shown) into positive engagement with the interior surface of the pipeline 12. This arrangement of the three wheels 32, 34 and 44, each of which are spring-biased outwardly, provides a three-point engagement with the interior walls of the pipeline 12 and insures a continuous, positive frictional engagement of the wheel 32 with the interior walls of the pipeline 12.

The wheel 32 is fabricated of a nonmagnetic material, such as stainless steel or plastic, and is provided with a plurality of small magnets 50 embedded in and uniformly spaced around the periphery of the wheel. Each of the magnets has the same pole, such as the north pole, turned inwardly toward the housing 13. As previously mentioned, the housing 13 is also fabricated from a nonmagnetic material. A wheel 52 is located within the housing 13 and is also fabricated of a nonmagnetic material. A number of magnets 54 are embedded in and uniformly spaced around the periphery of the wheel 52. Each of the magnets 54 has the south pole turned outwardly toward the periphery of the wheel 52. The peripheral spacing between the magnets 54 is equal to the peripheral spacing between the magnets 50 on the wheel 32. The magnetic force between the north pole of the magnet 50 which is adjacent the south pole of the magnet 54 passes through the nonmagnetic material of the housing 13. As the wheel 32 is rotated by friction with the pipeline as the device 10 is forced through the pipeline by the fluid flowing therein, each successive magnet 50 moves adjacent the wheel 52 and attracts a corresponding magnet 54 which moves with the magnet 50. In this manner, the wheel 52 is driven without direct mechanical coupling between the drive wheel 32 and the wheel 52 as the magnetic force between successive magnets 50 and 54 engage in much the same manner as gear teeth.

The wheel 52 is mounted on a shaft 56 which passes into a gear box 58. The output shaft 60 from the gear box 58 drives a tape recorder 64 which has the conventional tape-drive mechanism indicated generally by the reference numeral 66 for moving a record tape 67 past a recording head 72. The recording head 72 is capable of recording a plurality of separate tracks of electrical data on the single tape 67, the electrical data being put in at the terminals numbered 1 through 4. The recorder also has a tape storage reel 68 and a tape take-up reel 70. Due to the limited space within the housing 10, the drive shaft 60 to the tape recorder may pass through the take-up reel 70. The take-up reel can be mounted on the shaft 60 and provided with a slipping friction clutch to maintain tension on the record tape 67.

Also located within the housing 13 is any suitable leak detector 74 which preferably has circumferential inspection ability. The output from the leak detector is fed through a suitable conductor 76 to terminal number 1 of the recorder. A suitable reference marker detector 78 of any suitable type is also provided to produce a distinctive signal whenever the detector passes a magnetic or radioactive emitter disposed at known points outside the pipeline 12. The output from the reference marker detector 78 is fed through a suitable conductor 80 to terminal number 2 of the recorder. A timer 82 is also located within the housing 13 and may be spring-wound or battery operated. The timer 82 produces a pulse at arbitrarily selected time intervals. The pulse is fed through a suitable conductor 84 to terminal number 3 of the recorder. A counter 86 is provided to count the revolutions of the wheel 52. The counter 86 may be any suitable magnetic counter or microswitch which sends a pulse for each revolution or fraction of a revolution of the wheel 52. The pulse from the counter 86 is fed through a suitable conductor 88 to terminal number 4 of the recorder. A battery 90 may be provided to operate the various data-collecting devices.

Figure 2:
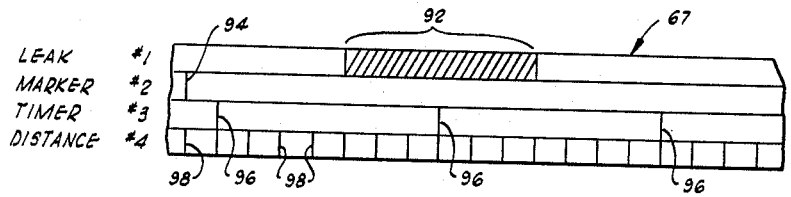
FIGURE 2 is a schematic illustration of a typical length of record tape produced by the device of FIG. 1 when passed through a pipeline.

A typical section of tape 67 having the four types of data recorded thereon is graphically illustrated in FIG. 2. The leak data produced by the leak detector 74 is shown on track number 1. This data will be in the form of a substantially continuous signal for a length 92 of the tape 67 corresponding to the length along the pipeline where the soil remained saturated with radioactive material. Track number 2 shows merely a single mark 94 which indicates the position of a reference marker located outside the pipeline at a known position. Track number 3 illustrates pulses 96 which were transmitted from the timer 82 at uniform intervals of time. So long as the device 10 is traveling at a uniform rate through the pipeline, the timing marks 96 will be uniformly spaced along the tape. However, any variation in speed of the device 10 will be shown and the velocity information can be integrated to provide a check against other distance information. Recording track number 4 shows marks 98 which represent a signal received from the switch 86 upon each rotation of the wheel 52. Since the tape 67 is itself driven by the wheel 52, the marks 98 will always be at uniform spacings along the tape 67. These distance marks 98 provide convenient reference points on the tape and also may be used in electronics equipment for integrating the distance traveled based on the velocity of the device. The data recorded on tracks 2, 3 and 4 of the tape 67 readily permits the accurate determination of the location of the leak indicated by the signal 92 on track 1. By having three different sources of information, the data can be cross-checked and any errors readily detected.

From the above description it will be evident that a novel and improved device has been disclosed for precisely locating leaks in buried pipelines. The length of the tape is directly proportional to the distance the device has traveled through the pipeline and is, therefore, very easily calibrated to give distances from a reference marker. The means for driving the tape recorder 64 comprising the drive wheel 32 and wheel 52, which is driven by means of the interlocking magnets, provides a means for driving the recorder which does not pass through the fluid-tight housing 13. No pressure seals or other means for excluding the high pressure fluid of the pipeline from the housing are required around a shaft which would otherwise be necessary to drive the recorder. Therefore, the device can readily be used in very high pressure pipelines.

Having thus described a particular embodiment of my invention, it is to be understood that various changes can be made therein without departing from the spirit and scope of my invention as defined by the appended claims.

I claim:
1. A device for logging pipeline data comprising:
   (a) a nonmagnetic fluid-tight housing transportable through a pipeline by the force of the fluid flowing therein,
   (b) a recording means mounted within said fluid-tight housing,
   (c) a drive wheel means rotatably journaled on said housing and adapted to engage the inner walls of said pipeline,
   (d) permanent magnet transmitting means mounted in said drive wheel means,
   (e) magnetic flux responsive means mounted within said housing, and
   (f) drive means connected between said magnetic flux responsive means and said recording means,
whereby movement of said housing through said pipeline will cause rotation of said drive wheel means, said permanent magnetic coupling means transporting the rotation of said wheel means to said magnetic flux responsive means wherein said recorder is driven at a speed corresponding to the rate of movement of said housing through said pipeline.

2. In a device for logging pipeline data wherein said device includes a fluid-tight housing transportable through a pipeline by the force of the fluid flowing therein, a recording means mounted within said housing means, and a recorder drive wheel means rotatably journaled on said housing and adapted to engage the inner walls of said pipeline, an improvement comprising:
   (a) permanent magnet transmitting means mounted in said drive wheel means,
   (b) magnetic flux responsive means mounted within said housing,
   (c) drive means connected between said magnetic flux responsive means and said recording means, and
   (d) means for communicating the flux from said transmitting means to said responsive means which is in said housing.

References Cited in the file of this patent

UNITED STATES PATENTS

| | | |
|---|---|---|
| 2,167,641 | Dewan | Aug. 1, 1939 |
| 2,243,555 | Faus | May 27, 1941 |
| 2,782,370 | Ver Nooy | Feb. 19, 1957 |
| 2,834,113 | En Dean et al. | May 13, 1958 |
| 2,980,854 | En Dean et al. | Apr. 18, 1961 |
| 3,064,127 | Green et al. | Nov. 13, 1962 |

FOREIGN PATENTS

| | | |
|---|---|---|
| 774,136 | Great Britain | May 8, 1957 |